(12) United States Patent  
Wells et al.

(10) Patent No.: US 8,805,657 B2  
(45) Date of Patent: Aug. 12, 2014

(54) MUSIC SEARCHING METHODS BASED ON HUMAN PERCEPTION

(71) Applicant: Gracenote, Inc., Emeryville, CA (US)

(72) Inventors: Maxwell J. Wells, Seattle, WA (US); Navdeep S. Dhillon, Seattle, WA (US); David Waller, Goleta, CA (US)

(73) Assignee: Gracenote, Inc., Emeryville, CA (US)

( * ) Notice: Subject to any disclaimer, the term of this patent is extended or adjusted under 35 U.S.C. 154(b) by 0 days.

(21) Appl. No.: 13/667,683

(22) Filed: Nov. 2, 2012

(65) Prior Publication Data

US 2013/0191088 A1 Jul. 25, 2013

Related U.S. Application Data

(63) Continuation of application No. 09/556,086, filed on Apr. 21, 2000, now Pat. No. 8,326,584.

(60) Provisional application No. 60/153,768, filed on Sep. 14, 1999.

(51) Int. Cl.  
*G06F 17/10* (2006.01)

(52) U.S. Cl.  
USPC .............................................. 703/2

(58) Field of Classification Search  
USPC .............................................. 703/2  
See application file for complete search history.

(56) References Cited

U.S. PATENT DOCUMENTS

| 4,677,466 A | 6/1987 | Lert, Jr. et al. |
| 5,436,653 A | 7/1995 | Ellis et al. |
| 5,499,294 A | 3/1996 | Friedman |
| 5,510,572 A | 4/1996 | Hayashi et al. |
| 5,536,902 A | 7/1996 | Serra et al. |

(Continued)

FOREIGN PATENT DOCUMENTS

| EP | 0283570 A3 | 9/1988 |
| EP | 0367585 A2 | 5/1990 |

(Continued)

OTHER PUBLICATIONS

"U.S. Appl. No. 09/556,086, Appeal Decision mailed Jul. 18, 2012", 8 pgs.

(Continued)

*Primary Examiner* — Hugh Jones  
(74) *Attorney, Agent, or Firm* — Schwegman, Lundberg & Woessner, P.A.

(57) ABSTRACT

A method for characterizing a musical recording as a set of scalar descriptors, each of which is based on human perception. A group of people listens to a large number of musical recordings and assigns to each one many scalar values, each value describing a characteristic of the music as judged by the human listeners. Typical scalar values include energy level, happiness, danceability, melodicness, tempo, and anger. Each of the pieces of music judged by the listeners is then computationally processed to extract a large number of parameters which characterize the electronic signal within the recording. Algorithms are empirically generated which correlate the extracted parameters with the judgments based on human perception to build a model for each of the scalars of human perception. These models can then be applied to other music which has not been judged by the group of listeners to give to each piece of music a set of scalar values based on human perception. The set of scalar values can be used to find other pieces that sound similar to humans or vary in a dimension of one of the scalars.

19 Claims, 8 Drawing Sheets

(56) References Cited

U.S. PATENT DOCUMENTS

| | | | |
|---|---|---|---|
| 5,621,454 | A | 4/1997 | Ellis et al. |
| 5,693,903 | A | 12/1997 | Heidorn et al. |
| 5,756,918 | A | 5/1998 | Funaki |
| 5,763,802 | A | 6/1998 | Aoki et al. |
| 5,767,893 | A | 6/1998 | Chen et al. |
| 5,806,024 | A | 9/1998 | Ozawa |
| 5,874,686 | A | 2/1999 | Ghias et al. |
| 5,925,843 | A | 7/1999 | Miller et al. |
| 5,960,411 | A | 9/1999 | Hartman et al. |
| 6,061,680 | A | 5/2000 | Scherf et al. |
| 6,076,111 | A | 6/2000 | Chiu et al. |
| 6,141,637 | A | 10/2000 | Kondo |
| 6,240,459 | B1 | 5/2001 | Roberts et al. |
| 6,266,429 | B1 | 7/2001 | Lord et al. |
| 6,297,439 | B1 | 10/2001 | Browne |
| 6,345,256 | B1 | 2/2002 | Milsted et al. |
| 6,498,955 | B1 | 12/2002 | McCarthy et al. |
| 6,539,395 | B1 | 3/2003 | Gjerdingen et al. |
| 8,326,584 | B1 | 12/2012 | Wells et al. |
| 2001/0004338 | A1 | 6/2001 | Yankowski |
| 2002/0033844 | A1 | 3/2002 | Levy et al. |
| 2002/0059208 | A1 | 5/2002 | Abe et al. |
| 2002/0116195 | A1 | 8/2002 | Pitman et al. |
| 2002/0178410 | A1 | 11/2002 | Haitsma et al. |

FOREIGN PATENT DOCUMENTS

| | | |
|---|---|---|
| EP | 0319567 B1 | 2/1993 |
| EP | 0936531 A2 | 8/1999 |
| WO | WO-9825269 A1 | 6/1998 |
| WO | WO-0120483 A2 | 3/2001 |
| WO | WO-0120609 A2 | 3/2001 |
| WO | WO-0128222 A2 | 4/2001 |
| WO | WO-0211123 A3 | 2/2002 |
| WO | WO-2006044622 A2 | 4/2006 |

OTHER PUBLICATIONS

"U.S. Appl. No. 09/556,086, Examiner's Amendment mailed Nov. 15, 2012", 3 pgs.

"U.S. Appl. No. 09/556,086, Examiner's Answer to Appeal mailed Jun. 2, 2009", 23 pgs.

"U.S. Appl. No. 09/556,086, Notice of Allowance mailed Jul. 25, 2012", 7 pgs.

"U.S. Appl. No. 09/556,086, Order Remanding Appeal to Examiner mailed May 8, 2009", 5 pgs.

"U.S. Appl. No. 09/556,086, Response filed Oct. 25, 2012 to Notice of Allowance and Notice of Allowability mailed Jul. 25, 2012", 15 pgs.

"U.S. Appl. No. 09/556,086, Response to Rule 312 Communication mailed Nov. 6, 2012", 2 pgs.

"International Application Serial No. PCT/US00/25286, International Search Report mailed Aug. 9, 2003", 3 pgs.

"International Application Serial No. PCT/US00/25287, International Search Report mailed Aug. 9, 2003", 2 pgs.

Foote, Jonathan T, "Content-Based Retrieval of Music and Audio", Proc. of the SPIE, Bellingham, US,, (1997), pp. 138-147.

Gibson, David, "Name That Clip: Music Retrieval Using Audio Clips", Disclosed at Public Conference at Berkeley, California, (Aug. 19, 1999), 10 pgs.

Katayose, Haruhiro, et al., "Sentiment Extraction in Music", IEEE, Faculty of Engineering Science, (1998).

Pfeiffer, Silvia, et al., "Automatic Audio Content Anlysis", ACM Multimedia 96, (1996), 21-30.

Tseng, Y, "Content-Based Retrieval for Music Collections", ACM, (Aug. 1999), 176-182.

Uitdenbogerd, Alexandra, et al., "Manipulation of Music for Melody Matching", ACM Multimedia, (1998), 235-240.

"U.S. Appl. No. 09/556,086, Appeal Brief filed Feb. 7, 2007", 29 pgs.

"U.S. Appl. No. 09/556,086, Final Office Action mailed Jul. 7, 2006", 13 pgs.

"U.S. Appl. No. 09/556,086, Non Final Office Action mailed Jan. 18, 2006", 8 pgs.

"U.S. Appl. No. 09/556,086, Non Final Office Action mailed Apr. 28, 2005", 8 pgs.

"U.S. Appl. No. 09/556,086, Non Final Office Action mailed Jun. 17, 2004", 8 pgs.

"U.S. Appl. No. 09/556,086, Reply Brief filed Aug. 27, 2007", 12 pgs.

"U.S. Appl. No. 09/556,086, Response filed Apr. 18, 2006 to Non Final Office Action mailed Jan. 18, 2006", 14 pgs.

"U.S. Appl. No. 09/556,086, Response filed Oct. 28, 2005 to Non Final Office Action mailed Apr. 28, 2005", 19 pgs.

"U.S. Appl. No. 09/556,086, Response filed Nov. 17, 2004 to Non Final Office Action mailed Jun. 17, 2004", 15 pgs.

"International Application No. PCT/EP01/09623, International Search Report mailed Jul. 2, 2002", 4 pages.

"The MusicBrainz Mailing List Archive for Nov. 2000", [Online]. Retrieved from the Internet: <URL:http://www.musicbrainz.org/pipermail/musicbrainz/2000-November.txt.gz>, 30 pgs.

Cheung, D., et al., "A content-based search engine on medical images for telemedicine", Proceedings of the 21st International Computer Software and Applications Conference, ComputerSoftware and Applications Conference, 1997, (Aug. 13, 1997), 569-572.

Haitsma, J. A., et al., "Robust Hashing of Multimedia Content", (Dec. 14, 2000), 10 pgs.

Haitsma, Jaap, "Robust Audio Hashing for Content Identification", n Proceedings of the Content-Based Multimedia Index, Italy, (Sep. 2001), 8 pgs.

Kurth, Frank, et al., "Full-Text Indexing of Very Large Audio Data Bases", Audio Engineering Society Convention Paper, 110th Convention, Amsterdam, (May 2001), 1-11.

Oostveen, Job, "Visual Hashing of Digital Video: Applications and Techniques", SPIE vol. 4472, (Aug. 2001), 11 pages.

Schneider, Marc, et al., "A Robust Content Based Digital Signature for Image Authentication", International Conference on Image Processing, 1996. Proceedings., vol. 3, (1996), 227-230.

Schneier, Bruce, "Chapter 16, Pseudo random sequence generators", Applied Cryptography: Protocols, Algorithms, and Source Code in C, John Wiley & Sons, 2nd Edition, (1996), 372-379.

Subramanya, S R, et al., "Transform-Based Indexing of Audio Data for Multimedia Databases", 1997 IEEE, (1997), 211-218.

Welsh, Matt, et al., "Querying Large Collections of Music for Similarity", Technical Report UCB/CSD00—1096, U.C. Berkeley Computer Science Division, Research sponsored by Advanced Research Projects Agency under grant DABT63-98-C-0038, and equipment grant from Intel Corp., (Nov. 1999), 13 pages.

Yang, Cheng, "MACS: Music Audio Characteristic Sequence Indexing for Similarity Retrieval", Supported by Leonard J. Shustek Fellowship, Stanford Graduate Fellowship program, and NSF Grant IIS-9811904 New Paltz, New York, (Oct. 2001), 123-126.

MUSIC SEARCHING METHODS BASED ON HUMAN PERCEPTION

CROSS REFERENCE TO RELATED APPLICATIONS

This application is a continuation of and claims the benefit of priority under 35 U.S.C. §120 to U.S. patent application Ser. No. 09/556,086, filed on 21 Apr. 2000, which claims the benefit of priority under 35 U.S.C. 119(e) to U.S. Provisional Patent Application Ser. No. 60/153,768, filed on 14 Sep. 1999, the benefit of each of which is claimed hereby, and each of which are incorporated by reference herein in its entirety.

1.0 BACKGROUND

Modern computers have made possible the efficient assemblage and searching of large databases of information. Text-based information can be searched for key words. Until recently, databases containing recordings of music could only be searched via the textual metadata associated with each recording rather than via the acoustical content of the music itself. The metadata includes information such as title, artist, duration, publisher, classification applied by publisher or others, instrumentation, and recording methods. For several reasons it is highly desirable to be able to search the content of the music to find music which sounds to humans like other music, or which has more or less of a specified quality as perceived by a human than another piece of music. One reason is that searching by sound requires less knowledge on the part of the searcher; they don't have to know, for example, the names of artists or titles. A second reason is that textual metadata tends to put music into classes or genres, and a search in one genre can limit the discovery of songs from other genres that may be attractive to a listener. Yet another reason is that searching by the content of the music allows searches when textual information is absent, inaccurate, or inconsistent.

A company called Muscle Fish LLC in Berkeley, Calif. has developed computer methods for classification, search and retrieval of all kinds of sound recordings. These methods are based on computationally extracting many "parameters" from each sound recording to develop a vector, containing a large number of data points, which characteristically describes or represents the sound. These methods are described in a paper entitled Classification, Search, and Retrieval of Audio by Erling Wold, Thom Blum, Douglas Keislar, and James Wheaton which was published in September 1999 on the Muscle Fish website at Musclefish.com, and in U.S. Pat. No. 5,918,223 to Blum et al entitled "Method and article of manufacture for content-based analysis, storage, retrieval, and segmentation of audio information."

The Blum patent describes how the authors selected a set of parameters that can be computationally derived from any sound recording with no particular emphasis on music. Data for each parameter is gathered over a period of time, such as two seconds. The parameters are well known in the art and can be easily computed. The parameters include variation in loudness over the duration of the recording (which captures beat information as well as other information), variation in fundamental frequency over the duration of the recording (often called "pitch"), variation in average frequency over the duration of the recording (often called "brightness"), and computation over time of a parameter called the mel frequency cepstrum coefficient (MFCC).

Mel frequency cepstra are data derived by resampling a uniformly-spaced frequency axis to a mel spacing, which is roughly linear below 100 Hz and logarithmic above 100 Hz. Mel cepstra are the most commonly used front-end features in speech recognition systems. While the mel frequency spacing is derived from human perception, no other aspect of cepstral processing is connected with human perception. The processing before taking the mel spacing involves, in one approach, taking a log discrete Fourier transform (DFT) of a frame of data, followed by an inverse DFT. The resulting time domain signal compacts the resonant information close to the t=0 axis and pushes any periodicity out to higher time. For monophonic sounds, such as speech, this approach is effective for pitch tracking, since the resonant and periodic information has little overlap. But for polyphonic signals such as music, this separability would typically not exist.

These parameters are chosen not because they correlate closely with human perception, but rather because they are well known and, in computationally extracted form, they distinguish well the different sounds of all kinds with no adaptation to distinguishing different pieces of music. In other words, they are mathematically distinctive parameters, not parameters which are distinctive based on human perception of music. That correlation with human perception is not deemed important by the Blum authors is demonstrated by their discussion of the loudness parameter. When describing the extraction of the loudness parameter, the authors acknowledge that the loudness which is measured mathematically does not correlate with human perception of loudness at high and low frequencies. They comment that the frequency response of the human ear could be modeled if desired, but, for the purposes of their invention, there is no benefit.

In the Blum system, a large vector of parameters is generated for a representative sample or each section of each recording. A human will then select many recordings as all comprising a single class as perceived by the human, and the computer system will then derive from these examples appropriate ranges for each parameter to characterize that class of sounds and distinguish it from other classes of sounds in the database. Based on this approach, it is not important that any of the parameters relate to human perception. It is only important that the data within the vectors be capable of distinguishing sounds into classes as classified by humans where music is merely one of the classes.

2.0 SUMMARY OF THE INVENTION

The invention builds on the extraction of many parameters from each recording as described by Blum and adds improvements that are particularly adapted to music and to allowing humans to find desired musical recordings within a large database of musical recordings. The invention is a method which performs additional computations with the Blum parameters and other similar parameters to model descriptors of the music based on human perception.

When human listeners compare one recording of music to another, they may use many different words to describe the recordings and compare the differences. There will often be little agreement between the humans as to the meanings of the descriptive words, or about the quantity associated with those words. However, for selected descriptive words, there will often be substantial agreement among large numbers of people.

For example, descriptive terms which immediately achieve substantial agreement among human listeners include: energy level and good/bad for dancing. Other descriptors of music with significant agreement among listeners include: sadness, happiness, anger, symphonicness, relative amount of singer contribution, melodicness, band size, countryness, metallicness, smoothness, coolness, salsa influence, reggae influence and recording quality. Other descriptors which immediately achieve consensus or which achieve consensus over time will be discovered as the methods achieve widespread implementation.

All of the above-mentioned descriptors of music are scalars—that is, they are one dimensional measures rather than multidimensional vectors of data. Scalars are chosen because most people cannot easily describe or even understand the difference between one multidimensional vector describing a recording of music and another multidimensional vector describing another recording of music. People tend to express themselves and think in scalars, such as "this recording is better for dancing than that recording." Sometimes they may combine many multi dimensional characteristics into a single category and think and express themselves in a scalar of that category. For example "this music is more country than that music."

In the methods of the present invention, rather than using a multidimensional vector with large amounts of data extracted from each musical recording, the originally extracted parameter data are mathematically combined with an algorithm that achieves a high correlation with one of the scalars of human perception. Each algorithm is empirically derived by working with large numbers of recordings and asking a listener, or preferably large numbers of listeners, to place the recordings in relative position compared to each other with respect to a descriptor such as energy level, or any of the above-listed descriptors, or any other descriptor. In other words, the data which is mathematically extracted from the music is further processed based on a computational model of human perception to represent the music as a set of scalars, each of which corresponds as well as possible with human perception.

In the invented methods, parameters such as those used by Blum are first calculated, but then, instead of storing the data of these calculated parameters, the data from the parameters is processed through each one of the algorithms to achieve a single number, a scalar, which represents the music with respect to a particular descriptor based on human perception. This collection of scalars is then stored for each musical recording. In other words, instead of working with a first derivative of data extracted from the original music recordings (the parameters), the invented methods work with a second derivative of data which is extracted from the first derivative of data. Processing through these algorithms is "lossy" in the sense that the original parameter data cannot be recreated from the set of scalars, just as the first derivative data computations of the parameters are "lossy" because the original music cannot be recreated from the parameter data.

By characterizing each musical recording as a set of scalar descriptors, each of which is based on human perception, the system allows a human to search for a recording where the descriptors fall within certain ranges or which, compared to a sample recording, has a little bit more or a little bit less, or a lot more or a lot less of any identified scalar characteristic.

Each algorithm for converting the parameter data, which is a first derivative of the music, into descriptor data, which is a second derivative based on the first derivative, can be of any type. The simplest type of algorithm simply applies a multiplied weighting factor to each data point measured for each parameter and adds all of the results to achieve a single number. However, the weightings need not be linear. Each weighting can have a complex function for producing the desired contribution to the resultant scalar. Each weighting can even be generated from a look-up table based on the value of each parameter datum. What is important is that the algorithm is empirically developed to achieve a high correlation with human perception of the selected descriptor. Of course, the algorithms will constantly be improved over time, as will the parameter extraction methods, to achieve better and better empirical correlation with human perception of the descriptors. Whenever improved extraction algorithms or combinatorial algorithms are ready for use, the set of scalars for each recording in the entire database is recalculated.

If a user wishes to find a recording which is similar to a recording which has not yet been processed into a set of scalar descriptors, the user provides a representative portion of the recording, or directs the system where to find it. The computer system extracts the parameters, combines them according to the algorithms with the appropriate weightings and develops a set of scalars for the recording which are calculated by the same methods as the scalars for recordings in the database. The new recording can then easily be compared to any recording already in the database.

The prior art literature describes many methods for extracting parameters from music. The inventors of these methods often apply labels which correspond somewhat with human perception such as "pitch," or "brightness." However, few of them, or none of them, correlate highly with human perception. In fact, there are many competing methods which yield different results for calculating a parameter with the same label such as "pitch," or "brightness." Although these competing calculation methods were typically derived in an attempt to roughly model human perception based on theories of sound, for most or all of the parameters, human perception can be better modeled by combining the results of several calculation methods in an algorithm with various weightings. This fact of reality is demonstrated by the well known phenomenon that the human ear requires greater amplification of low frequencies and high frequencies to perceive them as the same loudness compared to mid-range frequencies when played at low volume. It is well known that the best models for human perception of loudness apply a compensating algorithm based on frequency. Of course, loudness is not a meaningful descriptor of music because any musical recording can be played at high volume or low volume and original music can be recorded at high volume or low volume.

3.0 BRIEF DESCRIPTION OF THE DRAWINGS

FIG. 1 shows the prior art method described by Blum.

FIG. 2 describes the method by which Blum would find sounds that sound alike.

4.0 DETAILED DESCRIPTION

4.1 Prior Art

Figure 1:
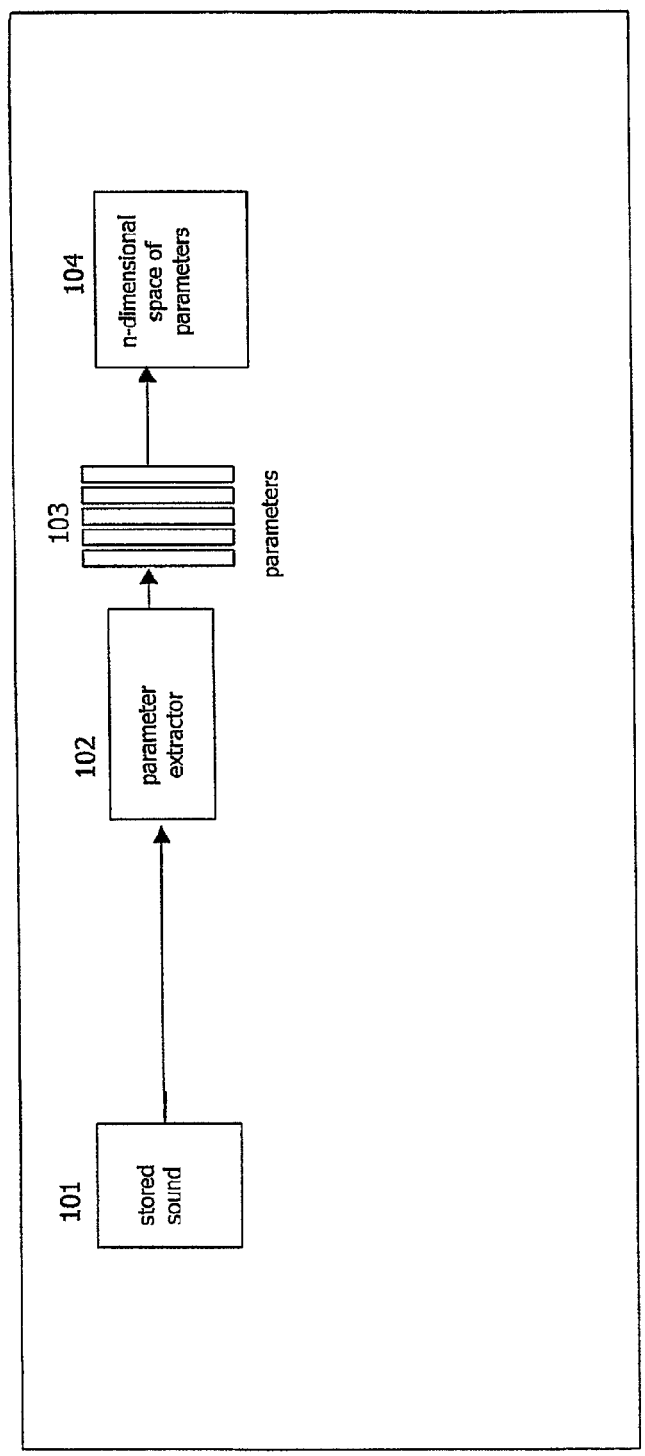

The prior art method of categorizing sounds, as described by Blum, is illustrated in FIG. 1. A database of stored sounds 101 is fed to a parameter extractor 102, where the sounds are decomposed using digital signal processing (DSP) techniques that are known in the art to create parameters 103 such as loudness, brightness, fundamental frequency, and cepstrum. These parameters are stored as multi-dimensional vectors in an n-dimensional space of parameters 104.

Figure 2:
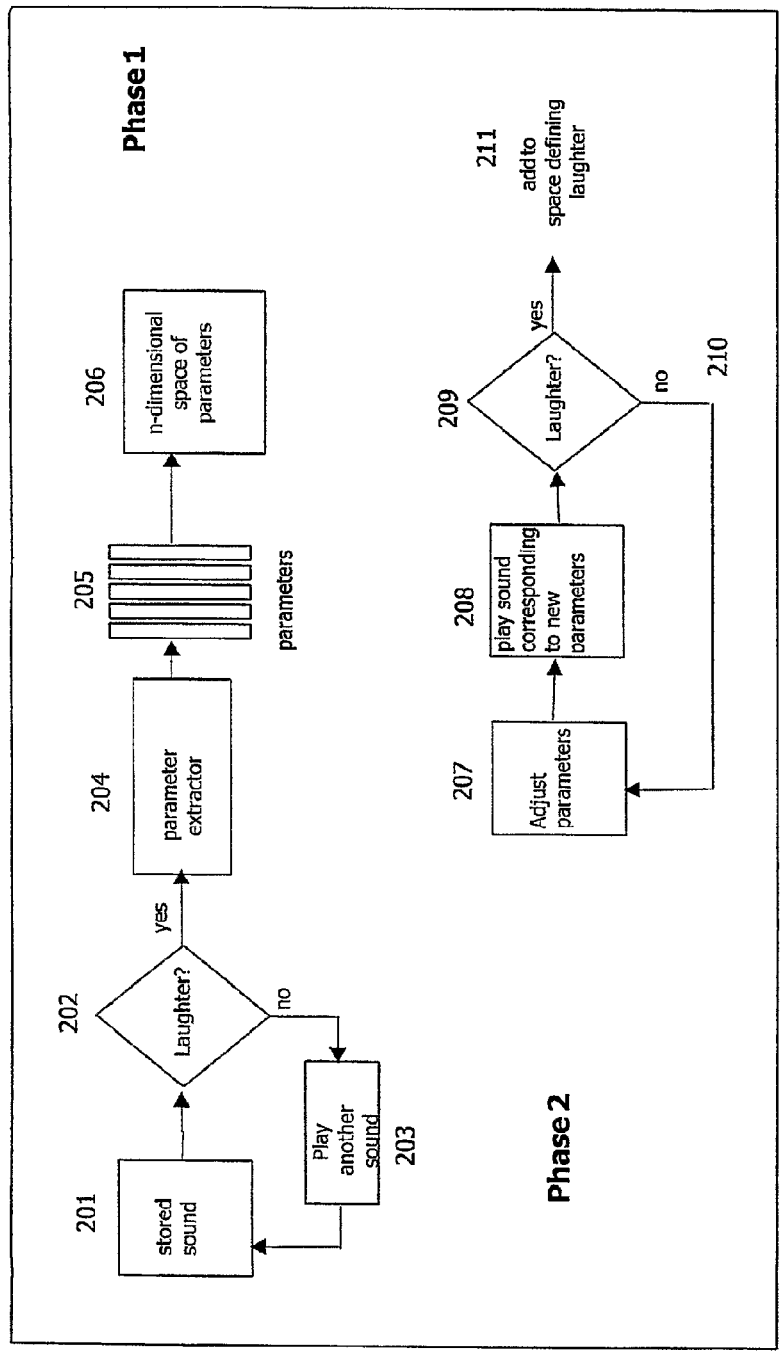

In order to find sounds that are alike, the procedure illustrated in FIG. 2 is used. In Phase 1, a human selects a sound, step 202, from a database of stored sounds 201, that falls into a category of sounds. For example, "laughter." This is the target sound. The target sound is fed into a parameter extractor 204 to create a number of parameters 205, with a large number of data points over time for each parameter. The parameters from the sound are then stored as a vector in an n-dimensional space 206.

It is assumed that all sounds within, or close to, the area describing laughter all sound like laughter. One way of exploring this is shown in Phase 2 of FIG. 2. The parameter values of the target sound are adjusted, step 207. A new sound is played, step 208, which corresponds with the adjusted parameter values. A human listens to the new sound and determines whether or not the new sound is perceptually similar to the target sound, step 209. If it is not, branch 210, the parameters are again adjusted, step 207, until a similar sound is found, or there are no more sounds. If a similar sound is found, then the parameter values of that sound are used to determine an area of similar sounding sounds.

The prior art puts sounds into classes. This classification is binary. Either something is like the target class or it is not. There is an assumption that mathematical distance of a parameter vector from the parameter vectors of the target class is related to the perceptual similarity of the sounds. Blum claims that this technique works for cataloging transient sounds. However, for music, it is unlikely that the relationship between two parameter vectors would have any relevance to the perceptual relationship of the music represented by those vectors. This is because the parameters bear insufficient relevance to the human perception of music. Also, music cannot be adequately represented with a binary classification system. A music classification system must account for the fact that a piece of music can belong to one of several classes. For example, something may be country with a rock influence. Also, a classification system must account for the fact that a piece of music may be a better or worse example of a class. Some music may have more or less elements of some descriptive element. For example, a piece of music may have more or less energy, or be more or less country than another piece. A set of scalar descriptors allows for more comprehensive and inclusive searches of music.

Figure 3:
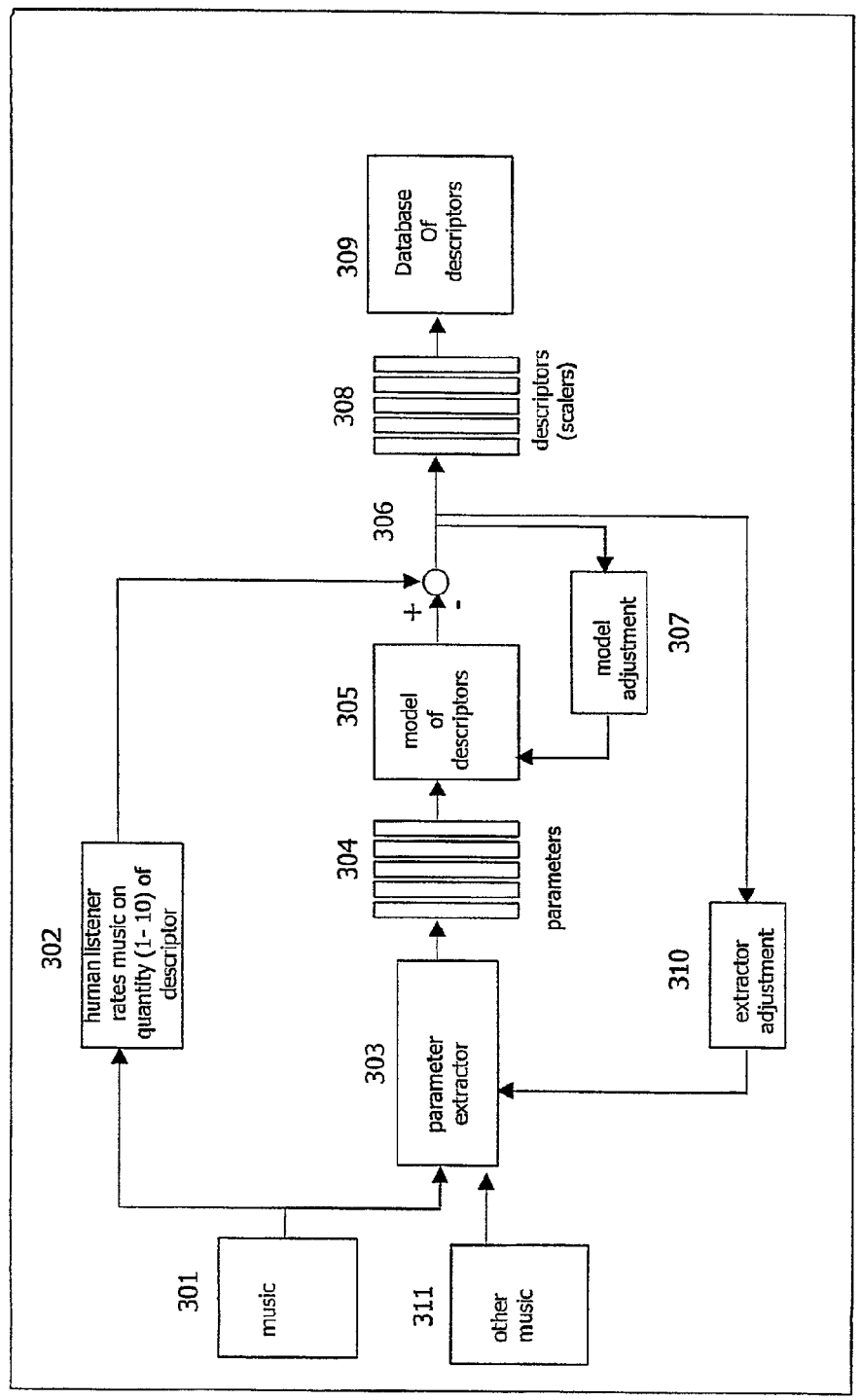
FIG. 3 is an illustration of the current invention as it is used to create a database of descriptors of music.
Figure 8:
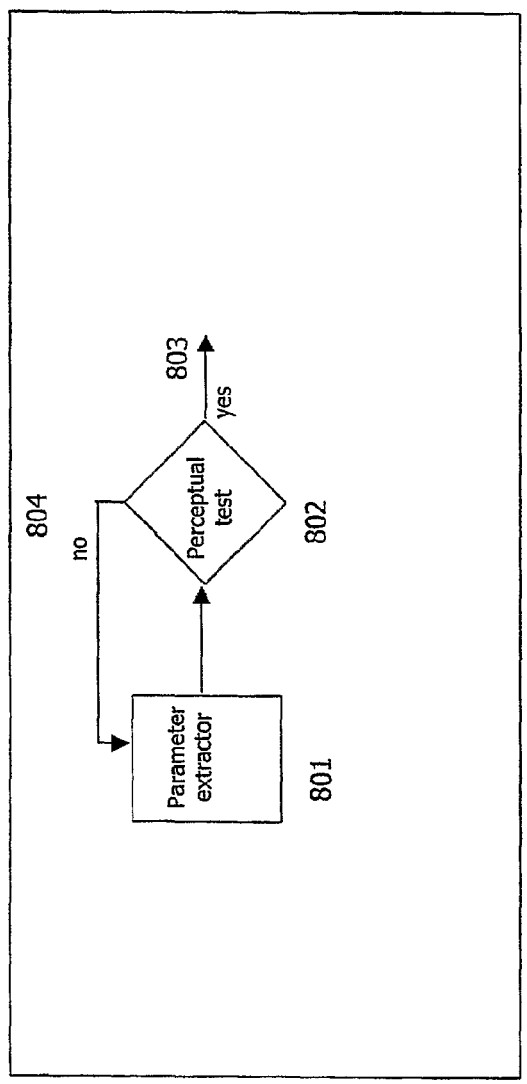
FIG. 8 is a method for determining the perceptual salience of a parameter.

4.2 Current Invention, Modeling Descriptors (FIGS. 3 and 8)

4.2.1 Overview of Operation

The invention described here is illustrated in FIG. 3. A database of stored music 301 is played to one or more humans, step 302, who rate the music on the amount of one or more descriptors. The same music is fed into a parameter extractor 303, that uses methods known in the art to extract parameters 304 that are relevant to the perception of music, such as tempo, rhythm complexity, rhythm strength, brightness, dynamic range, and harmonicity. Numerous different methods for extracting each of these parameters are known in the art. A model of a descriptor 305 is created by combining the parameters with different weightings for each parameter. The weightings may vary with the value of the parameter. For example, the parameter "brightness" may contribute to a descriptor value only when it is above a threshold or below a threshold or within a range. The model is refined, step 307, by minimizing the difference, calculated in step 306, between the human-derived descriptor value and the machine-derived value.

The objective of using human listeners is to create models of their perceptual processes of the descriptors, using a subset of all music, and to apply that model to the categorization of the set of all music.

4.2.2 Limitations of the Models

The limit on the goodness of the fit of the model (its predictive power) is determined by, among other things:

(1) The variability between the human responses, step 302: High variability means that people do not agree on the descriptors and any model will have poor predictive power.

(2) The intra-song variability in the set of all music: High variability within a song means than any one part of the song will be a poor representation of any other part of the same song. This will impede the listeners' task of judging a representative descriptor for that song, resulting in less accurate data and a less accurate model.

(3) How well the subset represents the set: The ability to create a model depends on the existence of patterns of parameters in similar songs. If the subset on which the model is based does not represent the patterns that are present in the set, then the model will be incorrect.

We can improve the performance of the model by:

(a) Choosing descriptors for which there is low inter-rater variability. Our criterion for selecting descriptors is a minimum correlation coefficient (r) of 0.5 between the mean from at least 5 human raters, and the individual scores from those raters.

(b) Applying the technique to music which has low intra-song variability (e.g. some Classical music has high variability within a song). One method for determining intra-song variability is to extract parameters from a series of short contiguous samples of the music. If more than half of the parameters have a standard deviation greater than twice the mean, then the song is classified as having high intra-song variability. Similarly, if more than half of the mean parameters of a song lie more than 3 standard deviations from the mean of the population, that song is classified as having high intra-song variability. This excludes less than 1% of all songs.

(c) Using statistical sampling techniques known in the art (for example, for political polling) to ensure that the subset represents the set.

4.2.3 Collecting Human Data

The preferred method for collecting human data is to use a panel of ear-pickers who listen to each song and ascertain the quantity of each of several descriptors, using a Lickert scale, which is well known in the art. For example, nine ear-pickers are given a rating scale with a list of descriptors, as shown below:

Rating Scales

1. Energy: How much does the song make you want to move or sing?

| 1 | 2 | 3 | 4 | 5 | 6 | 7 | 8 | 9 |
|---|---|---|---|---|---|---|---|---|
| No movement. | | Little movement | | Some Movement | | A lot of movement | | Very much |

-continued

| 1 | 2 | 3 | 4 | 5 | 6 | 7 | 8 | 9 |
|---|---|---|---|---|---|---|---|---|
| Very light Energy | | Light energy | | Medium Energy | | High energy | | movement Very high energy |

2. Rhythm salience: What is the relative contribution of the rhythm to the overall sound of the song?

| 1 | 2 | 3 | 4 | 5 | 6 | 7 | 8 | 9 |
|---|---|---|---|---|---|---|---|---|
| No rhythmic component | | Very little rhythm | | Moderate Rhythm | | A lot of rhythm | | The song is all rhythm |

3. Melodic salience: What is the relative contribution of the melody (lead singer/lead instrument} to the overall sound of the song?

| 1 | 2 | 3 | 4 | 5 | 6 | 7 | 8 | 9 |
|---|---|---|---|---|---|---|---|---|
| No melody | | Melody is not too important | | Melody is moderately Important | | Melody is quite important | | The song is all melody |

4. Tempo: Is the song slow or fast?

| 1 | 2 | 3 | 4 | 5 | 6 | 7 | 8 | 9 |
|---|---|---|---|---|---|---|---|---|
| Extremely slow | | Pretty slow | | Moderate tempo | | Pretty fast | | Extremely fast |

5. Density How dense is the song? How many sounds per second?

| 1 | 2 | 3 | 4 | 5 | 6 | 7 | 8 | 9 |
|---|---|---|---|---|---|---|---|---|
| Not at all dense | | A little dense | | Moderate density | | Fairly dense | | Extremely dense |

6. Mood (happiness): What is the overall mood or emotional valence of the song?

| 1 | 2 | 3 | 4 | 5 | 6 | 7 | 8 | 9 |
|---|---|---|---|---|---|---|---|---|
| Extremely sad | | Pretty sad | | Neither happy nor sad | | Fairly happy | | Extremely happy |

These data are analyzed, and only those descriptors for which there is high inter-rater agreement (low variability) are used in the development of the system. For example, the correlations between the mean ratings and the mean of the individual ratings for 7 descriptors are shown in the table below. All of the mean correlation values are above 0.5 and the descriptors anger, danceability, density, energy, happiness, melodic salience, and rhythmic salience are all acceptable for use within the present system.

| Mean Subject rating for: | Pearson correlation | | | | | | |
|---|---|---|---|---|---|---|---|
| | ANGER | DANCE | DENSITY | ENERGY | HAPPY | MELODIC SALIENCE | RHYTHM SALIENCE |
| with subject 101 | 0.76 | 0.74 | 0.68 | 0.88 | 0.83 | 0.67 | 0.73 |
| 102 | 0.73 | | 0.74 | 0.83 | 0.86 | 0.67 | 0.82 |
| 103 | 0.65 | | 0.68 | 0.85 | 0.77 | 0.72 | 0.30 |
| 104 | 0.56 | 0.40 | 0.71 | 0.77 | 0.66 | 0.72 | 0.63 |
| 105 | 0.75 | 0.74 | 0.69 | 0.85 | 0.72 | 0.14 | 0.37 |
| 106 | 0.70 | 0.88 | 0.75 | 0.88 | 0.83 | 0.39 | 0.87 |
| 107 | 0.69 | 0.84 | 0.71 | 0.81 | 0.59 | 0.57 | 0.74 |
| 108 | 0.63 | 0.89 | 0.76 | 0.89 | 0.83 | 0.57 | 0.86 |
| 201 | 0.82 | 0.85 | 0.86 | 0.81 | 0.73 | 0.44 | 0.83 |
| Mean Correlation values | 0.70 | 0.76 | 0.73 | 0.84 | 0.76 | 0.54 | 0.68 |
| Standard Error of Mean | 0.03 | 0.06 | 0.02 | 0.01 | 0.03 | 0.06 | 0.07 |

Another method uses music with known quantities of some descriptor as defined by the purpose to which it is put by the music-buying public, or by music critics. Our technique rank orders the recommended songs by their quantity of the descriptor, either using the values that come with the music, or using our panel of ear-pickers. For example, www.jamaicans.com/eddyedwards features music with Caribbean rhythms that are high energy. Amazon.Com features a mood matcher in which music critics have categorized music according to its uses. For example, for line dancing they recommend the following Wreck Your Life by Old 97's
The Best Of Billy Ray Cyrus by Billy Ray Cyrus
Guitars, Cadillacs, Etc., Etc. by Dwight Yoakam
American Legends Best Of The Early Years by Hank Williams
Vol. 1-Hot Country Hits by Mcdaniel, et al Another method uses professional programmers who create descriptors to create programs of music for play in public locations. For example, one company has discovered by trial and error the type of music they need to play at different times of the day to energize or pacify the customers of locations for which they provide the ambient music. They use the descriptor "energy," rated on a scale of 1 (low) to 5 (high). We used 5 songs at each of 5 energy levels and in 5 genres (125 songs total), extracted the parameters and created a model of the descriptor "energy" on the basis of the e company's human-derived energy values. We then applied that model to 125 different songs and found an 88% match between the values of our machine-derived descriptors and the values from the human-derived descriptors.

4.2.5 Modeling

The preferred method for representing each descriptor uses generalized linear models, known in the art (e.g. McCullagh and Neider (1989) Generalized Linear Models, Chapman and Hall). For example, the preferred model of "energy" uses linear regression, and looks like this:

$$\text{Energy} = \beta_0 + \beta_1 * \text{Harmonicity} + \beta_2 * \text{DynamicRange} + \beta_3 * \text{Loudness} + \beta_4 * \text{RhythmComplexity} + \beta_5 * \text{RhythmStrength} \quad (1)$$

The preferred weighting values are:

$\beta_0 = 4.92$
$\beta_1 = -1.12$
$\beta_2 = -45.09$
$\beta_3 = -7.84$
$\beta_4 = 0.016$
$\beta_5 = 0.001$ The preferred descriptor model for "happiness" is:

$$\text{Happiness} = \beta_0 + \beta_1 * \text{Articulation} + \beta_2 * \text{Attack} + \beta_3 * \text{NoteDuration} + \beta_4 * \text{Tempo} + \beta_5 * \text{DynamicRangeLow} + \beta_6 * \text{DynamicRangeHigh} + \beta_7 * \text{SoundSalience} + \beta_8 (\text{Key}) \quad (2)$$

The preferred weighting values are:

$\beta_0 = 6.51$
$\beta_1 = -4.14$
$\beta_2 = 8.64$
$\beta_3 = -15.84$
$\beta_4 = 14.73$
$\beta_5 = 6.1$
$\beta_6 = -8.7$
$\beta_7 = 11.00$
$\beta_8 = 0$ if no key; 10 if minor keys; 20 if major keys It is likely possible to improve each model by adjusting the weighting values $\beta_0$ to $\beta_n$, so that they vary with the input value of the parameter or using different extraction methods for one or more parameters or adding other parameters to the step of extracting parameters.

Another method of optimizing a descriptor model involves using non linear models. For example:

$$\text{Energy} = F(\beta_1 * \text{tempo}(\beta_2 * \text{tempo} + \beta_3 * \text{sound salience})) \quad (3)$$

where F is the cumulative normal distribution:

$$F(x) = 1/\sqrt{2\pi\sigma^2} \int_{-\infty}^{x} e^{-(x-\mu)^2/2\sigma^2} dx$$

$\sigma^2$ = the standard deviation of x
$\mu$ = the mean of x

The values of $\beta_n$ are set to 1.0. Other values will be substituted as we develop the process.

Yet another method involves using heuristics. For example, if the beats per minute value of a song is less than 60, then the energy cannot be more than some predetermined value.

The output from each descriptor model is a machine-derived descriptor 308. Several such descriptors for each song are stored in a database 309. The presently preferred descriptors for use in the preferred system are:

Energy
Tempo
Mood (happiness)
Mood (anger)
Danceability

Once the models of the descriptors have been created, using a subset of all available music 301, they are applied to the classification of other music 311. Tests are conducted to determine the fit between the descriptor models derived from the subset of music and the other music, by substituting some of the other music 311 into the process beginning with the parameter extractor 303. As new music becomes available, a subset of the new music is tested against the models by placing it into the process. Any adjustments of the models are applied to all of the previously processed music, either by reprocessing the music, or, preferably, reprocessing the parameters originally derived from the music. From time to time, a subset of new music is placed into the process at step 301. Thus, any changes in the tastes of human observers, or in styles of music can be measured and accommodated in the descriptor models.

4.2.4 Parameter Extractors

The following parameter extraction methods are preferred:

Harmonicity:

Harmonicity is related to the number of peaks in the frequency domain which are an Integer Multiple of the Fundamental (IMF) frequency. The harmonicity value is expressed as a ratio of the number of computed IMFs to a maximum IMF value (specified to be four). Harmonicity values H are computed for time windows of length equal to one second for a total of 20 seconds. Mean and standard deviation values are additional parameters taken over the vector H.

Loudness:

Loudness is defined to be the root mean square value of the song signal. Loudness values L were computed for time windows of length equal to one second for a total of 20 seconds.

Dynamic Range:

Standard deviation of loudness for 20 values, calculated 1/second for 20 seconds.

Rhythm Strength:

Rhythm strength is calculated in the same process used to extract tempo. First, a short-time Fourier transform spectrogram of the song is performed, using a window size of 92.8 ms (Hanning windowed), and a frequency resolution of 10.77 Hz. For each frequency bin in the range of 0-500 Hz, an onset track is formed by computing the first difference of the time history of amplitude in that bin. Large positive values in the onset track for a certain frequency bin correspond to rapid onsets in amplitude at that frequency. Negative values (corresponding to decreases in amplitude) in the onset tracks are truncated to zero, since the onsets are deemed to be most important in determining the temporal locations of beats. A correlogram of the onset tracks is then computed by calculating the unbiased autocorrelation of each onset track. The frequency bins are sorted in decreasing order based on the activity in the correlation function, and the twenty most active correlation functions are further analyzed to extract tempo information.

Each of the selected correlation functions is analyzed using a peak detection algorithm and a robust peak separation method in order to determine the time lag between onsets in the amplitude of the corresponding frequency bin. If a lag can be identified with reasonable confidence, and if the value lies between 222 ms and 2 seconds, then a rhythmic component has been detected in that frequency bin. The lags of all of the detected components are then resolved to a single lag value by means of a weighted greatest common divisor algorithm, where the weighting is dependent on the total energy in that frequency bin, the activity in the correlation function for that frequency bin, and the degree of confidence achieved by the peak detection and peak separation algorithms for that frequency bin. The tempo of the song is set to be the inverse of the resolved lag.

The rhythm strength is the sum of the activity levels of the 20 most active correlation functions, normalized by the total energy in the song. The activity level of each correlation function is defined as the sum-of-squares of the negative elements of second difference of that function. It is a measure of how strong and how repetitive the beat onsets are in that frequency bin.

Rhythm Complexity:

The number of rhythmic events per measure. A measure prototype is created by dividing the onset tracks into segments whose length corresponds to the length of one measure. These segments are then summed together to create a single, average onset track for one measure of the song, this is the measure prototype. The rhythm complexity is calculated as the number of distinct peaks in the measured prototype.

Articulation is the ratio of note length, ie the duration from note start to note end (L) over the note spacing ie the duration of one note start to the next note start (S). An L:S ratio close to 1.00 reflects legato articulation. Ratios less than 1.00 are considered staccato.

Attack is the speed at which a note achieves its half-peak amplitude.

Note Duration

Pitch is extracted by using a peak separation algorithm to find the separation in peaks in the autocorrelation of the frequency domain of the song signal. The peak separation algorithm uses a windowed threshold peak detection algorithm which uses a sliding window and finds the location of the maximum value in each of the peak-containing-regions in every window. A peak-containing-region is defined as a compact set of points where all points in the set are above the specified threshold, and the surrounding points are below the threshold. A confidence measure in the pitch is returned as well; confidence is equal to harmonicity. Pitch values P are computed for time windows of length equal to 0.1 second. Changes of less than 10 Hz are considered to be one note.

Tempo

The tempo extraction technique is described in an earlier section on rhythm strength.

Dynamic Range Low

Standard deviation of loudness calculated over a duration of 10 seconds.

Dynamic Range High

Standard deviation of loudness calculated over a duration of 0.1 seconds.

Sound Salience

Uses a modified version of the rhythm extraction algorithm, in which spectral events without rapid onsets are identified.

Key

Determines the key by the distribution of the notes identified with the note extractor.

4.2.6 Optimizing the Parameter Extractors

Another method for optimizing the fit between the human-derived descriptor value and the machine-derived value is to adjust the extractor performance, step 310. This can be accomplished by using extractors in which some or all of the internal values, for example the sample duration, or the upper or lower bounds of the frequencies being analyzed, are adjusted. The adjustment is accomplished by having an iterative program repeat the extraction and adjust the values until the error, step 306, between the human values and the machine values is minimized.

It is important that the parameters extracted from the music have some perceptual salience. This is tested using the technique illustrated in FIG. 8. The parameter extractor 801 is tested, step 802, by visually or audibly displaying the parameter value while concurrently playing the music from which it was extracted. For example, a time history of the harmonicity values of a song, sampled every 100 ms, is displayed on a screen, with a moving cursor line. The computer plays the music and moves the cursor line so that the position of the cursor line on the x-axis is synchronized with the music. If the listener or listeners can perceive the correct connection between the parameter value and the changes in the music then the parameter extractor is considered for use in further model development, branch 803. If it is not perceived, or not perceived correctly, then that extractor is rejected or subjected to further improvement, branch 804.

Figure 4:
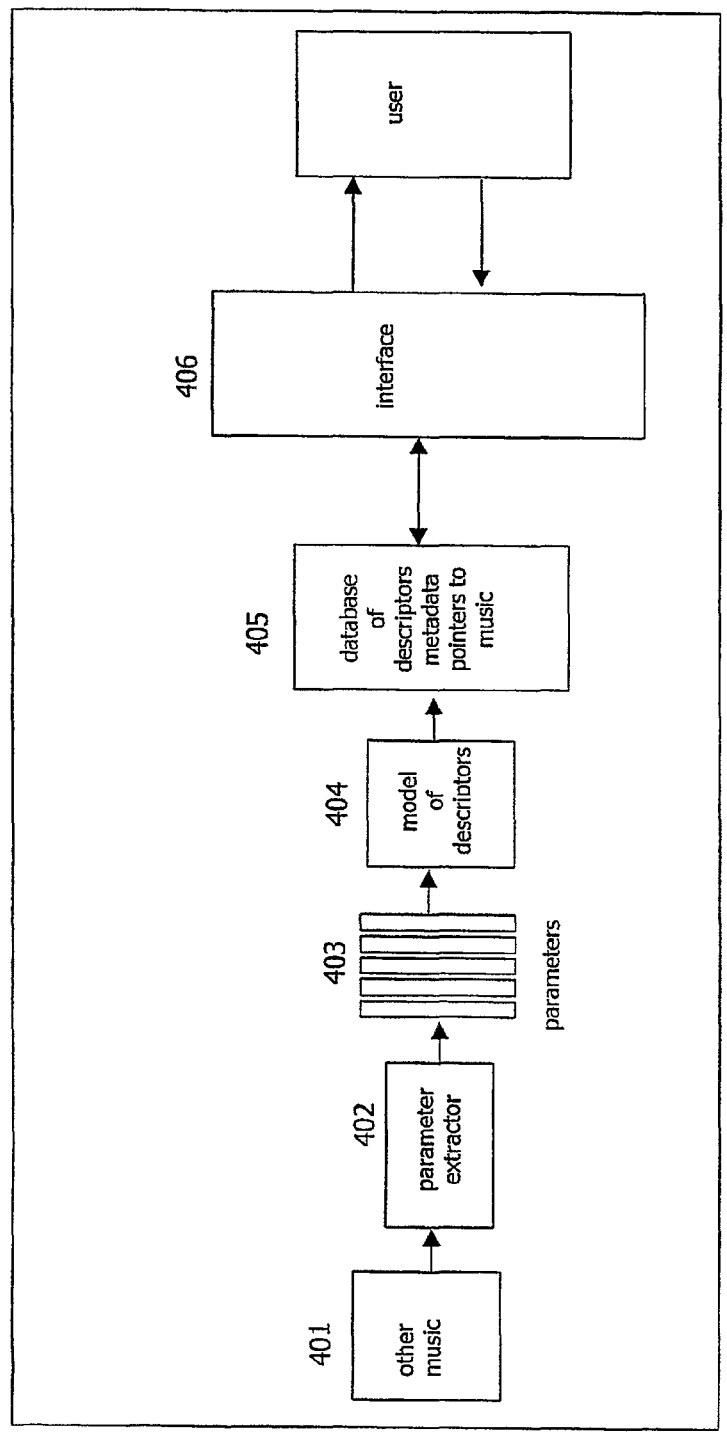
FIG. 4 illustrates a method for creating and searching a database.
Figure 5:
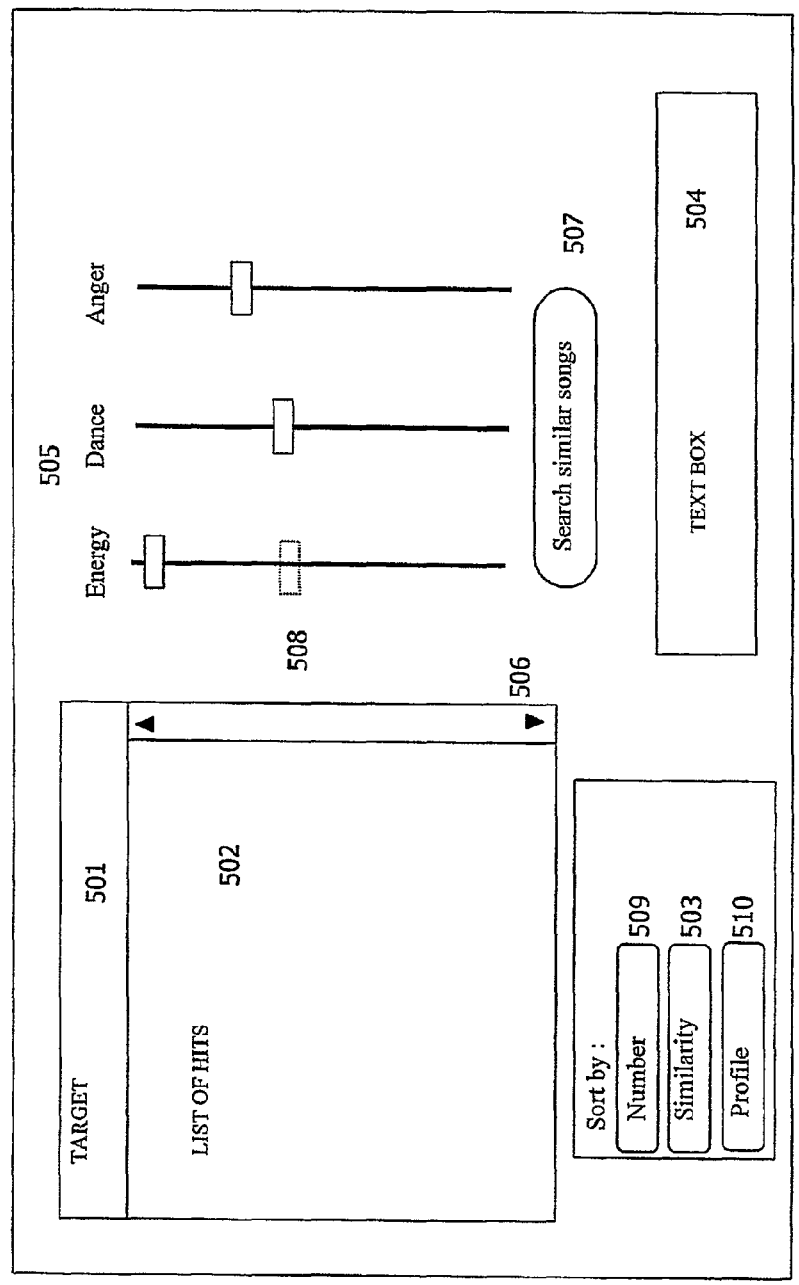
FIG. 5 is an example of an interface used to interact with a database.

4.3 Interacting with the Database (FIGS. 4 and 5)

Once the database of descriptors 309 has been created, it can be combined with other meta data about the music, such as the name of the artist, the name of the song, the date of recording etc. One method for searching the database is illustrated in FIG. 4. A large set of music 401, representing "all music" is sent to the parameter extractor 402. The descriptors are then combined with other meta data and pointers to the location of the music, for example URLs of the places where the music can be purchased, to create a database 405. A user can interrogate the database 405, and receive the results of that interrogation using an interface 406.

An example of an interface is illustrated in FIG. 5. A user can type in textural queries using the text box 504. For example; "Song title: Samba pa ti, Artist: Santana." The user then submits the query by pressing the sort by similarity button 503. The song "Samba pa ti" becomes the target song, and appears in the target box 501. The computer searches the n dimensional database 405 of vectors made up of the song descriptors, looking for the smallest vector distances between the target song and other songs. These songs are arranged in a hit list box 502, arranged in increasing vector distance (decreasing similarity). An indication of the vector distance between each hit song and the target song is shown beside each hit song, expressed as a percent, with 100% being the same song. For example, the top of the list may be "Girl from Ipanema by Stan Getz, 85%."

Another type of query allows a user to arrange the songs by profile. First, the user presses the sort by number button 509 which lists all of the songs in the database in numerical order. The user can scroll through the songs using a scroll bar 506. They can select a song by clicking on it, and play the song by double clicking on it. Any selected song is profiled by the slider bars 505. These show the scalar values of each of several descriptors. The current preferred method uses energy, danceability and anger. Pressing the sort by profile button 510 places the highlighted song in the target box 501 and lists songs in the hit box 503 that have the closest values to the values of the target song.

Yet another type of query allows the user to sort by similarity plus profile. First a target song is chosen and the songs in the hit box 502 are listed by similarity. Then the user performs a search of this subset of songs by using the slider bars 505. For example, the slider values of the original target song are 5, 6, 7 for energy, danceabilty and anger respectively. The user increases the energy value from 5 to 9 and presses the search similar songs button 507. The profile of the target song remains as a ghosted image 508 on the energy slider. The computer searches the subset of songs for a song with values of 9, 6 and 7. Songs with that profile are arranged in decreasing order of similarity. Songs without that profile are appended, arranged by decreasing similarity. The target song remains in the target box 501. A user can choose a new target song by clicking on a song in the hit list box 502.

Figure 6:
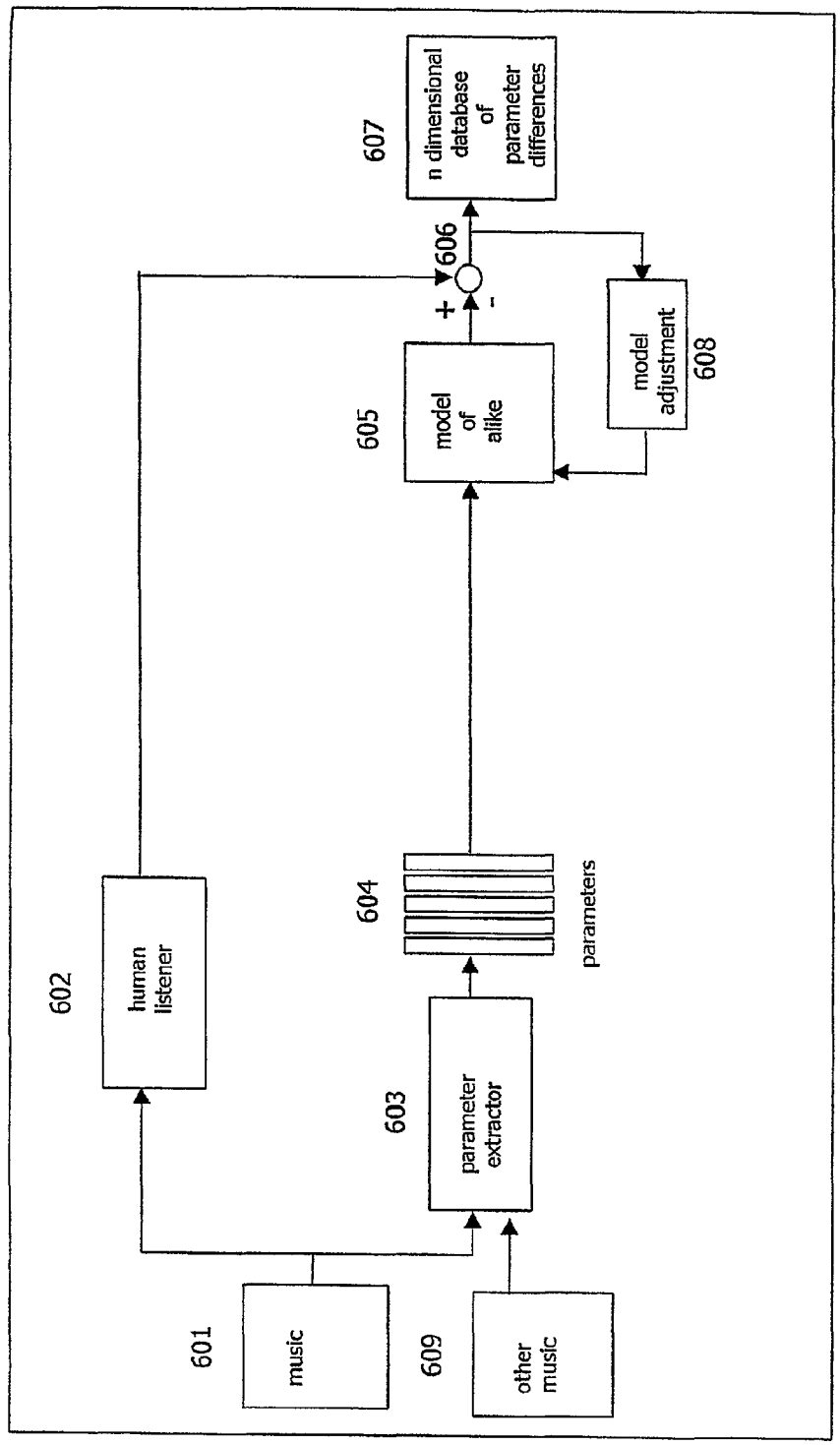
FIG. 6 illustrates how the current invention is used to find music that humans perceive as sounding alike using weighted parameters.

4.4 Modeling Likeness with Parameters (FIG. 6)

FIG. 6 illustrates how the invention is used to find music that sounds to human listeners like any musical composition selected by a user. The processes in FIG. 3 are repeated to create a set of parameters 604. These are used to create a model of likeness 605 by a process described below.

4.4.1 Collecting Human Data

One or more humans listen to pairs of songs and judge their similarity on a scale, for example from 1 to 9, where 1 is very dissimilar, and 9 is very similar, step 602.

The objective of using human listeners is to create a model of their perceptual process of "likeness", using a subset of all music, and to apply that model to the set of all music.

The preferred method for collecting human data is to use a panel of ear-pickers who listen to pairs of songs and score their similarity, using a Lickert scale, which is well known in the art.

Another method is to have people visit a web site on which they can listen to pairs of songs and make similarity judgments. These judgments could be on a scale of 1 to 9, or could be yes/no. It is possible to estimate a scalar value of similarity based on a large number of binary judgments using statistical techniques known in the art.

4.4.2 Creating the Likeness Model

The objective of the model is to predict these perceived differences using the extracted parameters of music. To build the model, a list of numbers is calculated for the comparison of each song to each other song. The list of numbers consists of a value for each parameter where the value is the difference between the parameter value for a first song and the value of the same parameter for a second song. When the model is used to compare one song to another for likeness, the list of parameter differences between the two songs is calculated and these differences are the inputs to the model. The model then yields a number that predicts the likeness that people would judge for the same two songs. The model processes the list of difference values by applying weights and heuristics to each value.

The preferred method of creating a model of likeness is to sum the weighted parameter values. For example, for three parameters, A, B and C, the following steps are used for songs 1 and 2:

STEP 1—subtract the parameters of each song $$A_1-A_2, B_1-B_2, C_1-C_2$$

STEP 2—calculate the absolute differences. Our preferred method uses a value of n=2, but other values can be used.

$$\sqrt[n]{(A_1-A_2)^n}, \sqrt[n]{(B_1-B_2)^n}, \sqrt[n]{(C_1-C_2)^n}$$

STEP 3—weight and sum the differences. The values of the weights ($\beta_1-\beta_n$) are determined by linear regression, as explained below.

$$\text{Likeness}=\beta_1 * A_{difference}+\beta_2 * B_{difference}+\beta_3 * C_{difference}$$

The value of the weights are determined by a process of linear regression, step 608, which seeks to minimize the difference, step 606, between the human-derived likeness values, step 602, and the output from the model, 605. The preferred model of likeness is:

$$\text{Likeness}=\beta_0+\beta_1*\text{mean loudness}+\beta_2*\text{rhythm strength}+\beta_3*\text{tempo}+\beta_4*\text{dynamic range}+\beta_5*\text{mean brightness}+\beta_6*\text{mean harmonicity}+\beta_7*\text{rhythm complexity}+\beta_8*\text{standard deviation brightness}+\beta_9*\text{standard deviation harmonicity} \quad (4)$$

Where $\beta_1=-0.108$
$\beta_2=-0.225$
$\beta_3=-0.127$
$\beta_4=-0.015$
$\beta_5=-0.296$
$\beta_6=-0.223$
$\beta_7=-0.122$
$\beta_8=0.277$
$\beta_9=-0.074$ Another method for deriving likeness is to calculate the correlation coefficients (r) of the parameter values between each pair of songs in the database, and to create a matrix of similarity for the songs, with high correlation equating to high similarity. The parameter values are normalized to ensure that they all have the same range. Song 1 provides the parameters for the x values, and song 2 provides the parameters for the y values in the following formula:

$$r=\Sigma(x_i-x_{mean})(y_i-y_{mean})/\sqrt{\{[\Sigma(x_i-X_{mean})^2][\Sigma(y_i-Y_{mean})^2]\}}$$

Where $X_{mean}$ and $Y_{mean}$ are the means of the normalized parameter values for songs 1 and 2.

The rationale behind using correlation coefficients is that if the parameters of two songs have a high positive correlation which is statistically significant then the two songs will be judged to be alike.

4.4.3 Organizing and Storing the Likeness Data

The preferred method of storing and organizing the parameter differences data is as a multi dimensional vector in a multi dimensional database 607. The resulting matrix contains $n*(n-1)/2$ cells where n is the number of songs. The model is used by starting with a target song 609, calculating the difference in value for each parameter between the comparison song and the songs in the target database, steps 603-605, and then applying the model to the difference values to arrive at a value which represents the likeness between the comparison song and each song in the target database.

An alternative method precomputes the 2 dimensional similarity matrix such that each song is connected with only those songs with which there is a match above a predetermined value. Thus, the low matching songs are culled from the similarity matrix. This decreases the size of the database and can increase the search speed.

4.4.4 Limitations of the Model

The limit on the goodness of the fit of the model (its predictive power) is determined by, among other things:

(1) The variability between the human responses, step 602. High variability means that people do not agree on the descriptors and any model will have poor predictive power.

(2) The intra song variability in the set of all music. High variablity within a song means than any one part of the song will be a poor representation of any other part of the same song. This will impede the listeners' task of judging similarity between such songs, resulting in less accurate data and a less accurate model.

(3) How well the subset represents the set. The ability to create a model depends on the existence of patterns of parameters in similar songs. If the subset on which the model is based does not represent the patterns that are present in the set, then the model will be incorrect.

We have found that a group of 12 human observers had a correlation coefficient of 0.5 or greater in what they consider sounds alike. This indicates that there is sufficient inter-rater reliability to be able to model the process. We can further improve our chances of successfully using the model to predict what sounds alike by:
    (a) Only applying the technique to music which has low intra-song variability (e.g. some Classical music has high variability within songs).
    (b) Using statistical sampling techniques known in the art (for example, for political polling) to ensure that the subset represents the set.

Figure 7:
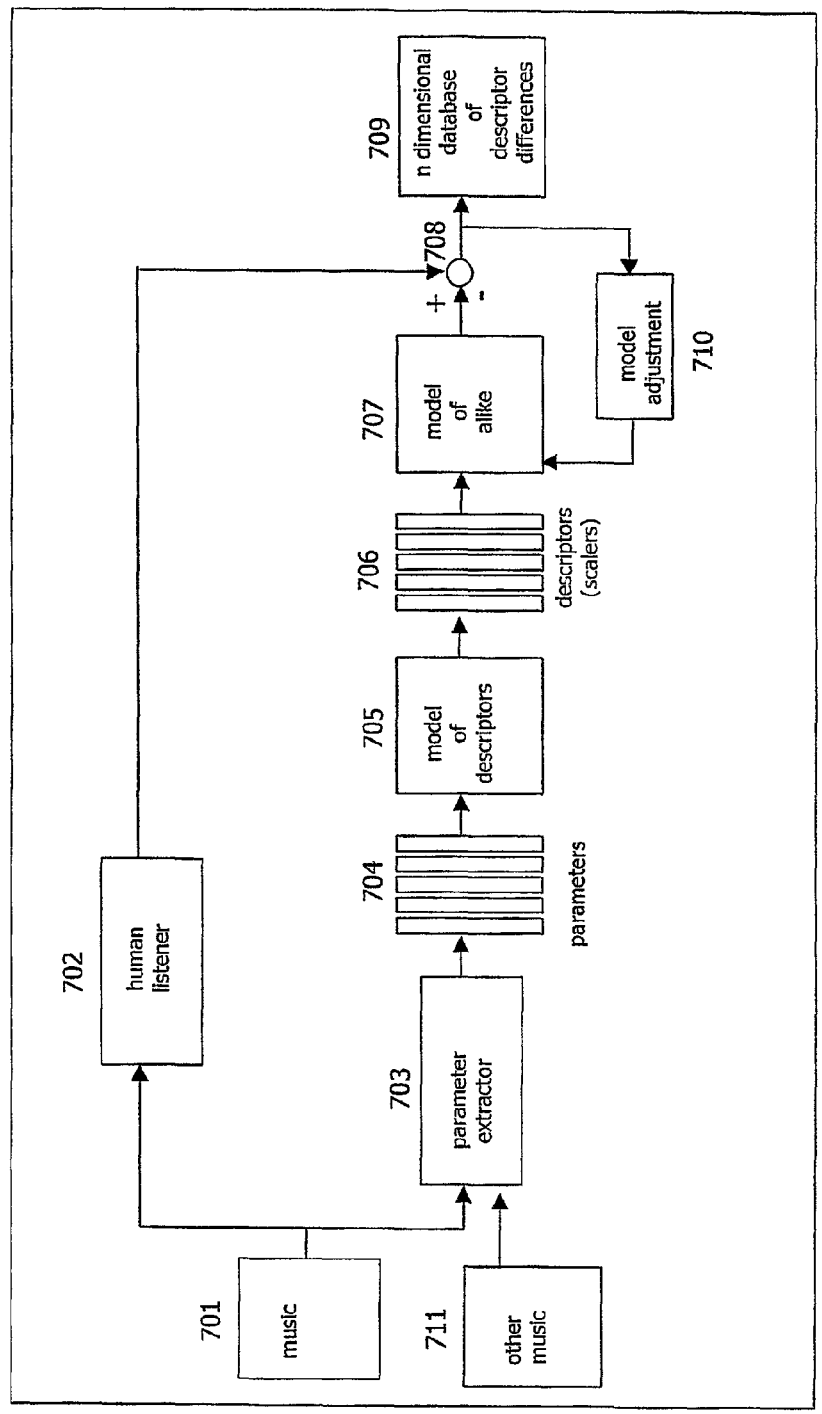
FIG. 7 illustrates how the current invention is used to find music that humans perceive as sounding alike using weighted descriptors.

4.5 Modeling Likeness with Descriptors (FIG. 7)

FIG. 7 illustrates an alternative method for finding music that sounds to human listeners like any musical composition selected by a user. The processes in FIG. 3 are repeated to create a set of descriptors 706. These are used to create a model of likeness 707 by a process similar to that used to create the model of likeness using parameters 605.

4.5.1 Collecting Human Data

One or more humans listen to pairs of songs and judge their similarity on a scale, for example from 1 to 9, where 1 is very dissimilar, and 9 is very similar, step 702. The objective of using human listeners is to create a model of their perceptual process of "likeness", using a subset of all music, and to apply that model to the set of all music. The preferred or alternative methods of collecting human data described with FIG. 6 are used.

4.5.2 Creating the Likeness Model

The objective of the model is to predict the perceived differences using the modelled descriptors of music. To build the model, a list of numbers is calculated for the comparison of each song to each other song. The list of numbers consists of a value for each descriptor where the value is the difference between the descriptor value for a first song and the value of the same descriptor for a second song. When the model is used to compare one song to another for likeness, the list of descriptor differences between the two songs is calculated and these differences are the inputs to the model. The model then yields a number that predicts the likeness that people would judge for the same two songs. The model processes the list of descriptor difference values by applying weights and heuristics to each value.

The preferred method of creating a model of likeness is to sum the weighted descriptor difference values. For example, for three descriptors, A, B and C, the following steps are used for songs 1 and 2:

STEP 1—subtract the descriptors of each song $$A_1-A_2, B_1-B_2, C_1-C_2$$

STEP 2—calculate the absolute differences. Our preferred method uses a value of n=2, but other values can be used.

$$\sqrt[n]{(A_1-A_2)^n}, \sqrt[n]{(B_1-B_2)^n}, \sqrt[n]{(C_1-C_2)^n}$$

STEP 3—weight and sum the differences. The values of the weights ($\beta_1$–$\beta_n$) are determined by linear regression, as explained below.

$$\text{Likeness} = \beta_1 * A_{difference} + \beta_2 * B_{difference} + \beta_3 * C_{difference}$$

The value of the weights are determined by a process of linear regression, step 710, which seeks to minimize the difference, step 708, between the human-derived likeness values, step 702, and the output from the model. The preferred model of likeness is:

$$\text{Likeness} = \beta_0 + \beta_1 * \text{Energy} + \beta_2 * \text{Tempo} + \beta_3 * \text{Happiness} + \beta_4 * \text{Anger} + \beta_5 * \text{Danceability} \quad (5)$$

$\beta_0 = 0$
$\beta_1 = 11.4$
$\beta_2 = 0.87$
$\beta_3 = 4.1$
$\beta_4 = 6.3$
$\beta_5 = 15.94$ The alternative methods of calculating likeness using correlations of parameters are also used with the descriptors. The preferred weightings of the descriptors are:
    Energy=4.5
    Tempo=2.1
    Happiness=0.78
    Anger=0.55
    Danceability=3.7

4.5.3 Organizing and Storing the Likeness Data

The preferred and alternative methods of organizing and storing the parameter differences data for calculating likeness are also used when the process uses descriptors. In addition, there is yet another alternative for calculating likeness. It involves precomputing a series of hierarchical listings of the songs organized by their descriptor values. For example, all of the songs in the database are organized into nine classes according to their energy values. Then all of the songs with an energy value of 9 are organized by their tempo values, then all of the songs with energy value 8 are organized into their tempo values, and so on, through all levels of all of the descriptors. The sorting results in a maximum of $L^n$ similarity classes, where L is the number of levels of each descriptor and n is the number of descriptors. In this case, 59049 classes. The songs in each class have the identical descriptor values. This provides an alternative type of likeness.

4.5.4 Limitations of the Model

There are the same limitations on the model based on descriptors as there are on the model based on parameters.

4.5.6 Searching the Likeness Database

The likeness database may be quickly searched by starting with any song and immediately finding the closest songs. A more enhanced search combines a similarity search with a descriptor search and the descriptor adjustment step described above. The steps are:
    1a. Find a list of likeness matches, including some that are somewhat different
    1b. Present only the acceptable likeness songs.
    2. When a search adjusted by a scalar descriptor is requested, rank the entire list of likeness matches (1a) by the descriptor to be adjusted.
    3. Present a new list based on the adjusted values with the best matches at the top.

This means that the likeness list (1a.) compiled for the original search is much broader than the list displayed for the user (1b), and includes songs that are less similar to the initial target song than would be tolerated by the listener. These poorer likeness matches lie below the presentability threshold for the initial target.

What is claimed is:

1. A method comprising:
    analyzing a musical recording by performing digital signal processing to obtain a mathematical analysis of sounds recorded in the musical recording;
    calculating a first derivative parameter of the musical recording from the mathematical analysis of the sounds recorded in the musical recording;

using a computer, determining a second derivative parameter of the musical recording based on the calculated first derivative parameter of the musical recording,
    the second derivative parameter being a scalar that represents an extent to which a descriptor is humanly perceivable in music represented by the musical recording;
storing the determined second derivative parameter of the musical recording as a characteristic of the musical recording;
receiving a search query that references a portion of a representative recording for which a similar recording is sought;
analyzing the portion of the representative recording by performing digital signal processing to obtain a further mathematical analysis of sounds recorded in the portion;
calculating a further first derivative parameter of the portion from the further mathematical analysis of the sounds recorded in the portion;
determining a further second derivative parameter of the portion,
    the further second derivative parameter being a further scalar that represents a different extent to which the descriptor is humanly perceivable in the portion; and
in response to the search query, providing a search result that references the musical recording based on a comparison of the scalar to the further scalar.

2. The method of claim 1, wherein:
the determining of the second derivative parameter includes multiplying the first derivative parameter by a weight factor.

3. The method of claim 2, wherein:
the weight factor by which the first derivative parameter is multiplied is nonlinear with respect to the first derivative parameter.

4. The method of claim 2, wherein:
the weight factor by which the first derivative parameter is multiplied is accessed from a lookup table that correlates the weight factor with the first derivative parameter.

5. The method of claim 4, wherein:
the lookup table from which the weight factor is accessed includes values generated based on empirical data from human listeners of a plurality of musical recordings.

6. The method of claim 1, wherein:
the calculating of the first derivative parameter is performed as part of calculating a set of first derivative parameters from the mathematical analysis of the sounds recorded in the musical recording; and
the determining of the second derivative parameter is based on the calculated set of first derivative parameters.

7. The method of claim 6, wherein:
the determining of the second derivative parameter includes individually weighting each first derivative parameter among the set of first derivative parameters.

8. The method of claim 7, wherein:
the weighting of each first derivative parameter is based on an empirically generated lookup table that correlates each first derivative parameter with a corresponding weight factor.

9. The method of claim 1, wherein:
the calculated first derivative parameter represents a mathematical measurement extracted from the mathematical analysis of the sounds recorded in the musical recording,
    the mathematical measurement being selected from a group consisting of harmonicity, loudness, dynamic range, rhythm strength, rhythm complexity, articulation, attack, note duration, tempo, and key.

10. The method of claim 1, wherein:
the determined second derivative parameter quantifies the descriptor that is humanly perceivable in the music represented by the musical recording,
    the descriptor being a descriptive word selected from a group consisting of happiness, anger, and danceability.

11. The method of claim 1 further comprising:
receiving a search query that specifies a range that corresponds to the descriptor that is humanly perceivable in the music;
in response to the search query, providing a search result that references the musical recording based on the scalar being within the range specified by the search query.

12. The method of claim 1 further comprising:
receiving a search query that identifies a representative recording;
accessing a further second derivative parameter of the representative recording,
    the further second derivative parameter being a further scalar that represents a different extent to which the descriptor is humanly perceivable in the representative recording; and
in response to the search query, providing a search result that references the musical recording based on a comparison of the scalar to the further scalar.

13. The method of claim 1, wherein:
the received search query includes the portion of the representative recording.

14. The method of claim 1, wherein:
the received search query identifies a location of the portion of the representative recording; and
the analyzing of the portion of the representative recording includes accessing the portion based on the identified location.

15. The method of claim 1, wherein:
the calculated first derivative parameter of the musical recording characterizes the sounds that are recorded in the musical recording.

16. The method of claim 1, wherein:
the determined second derivative parameter of the musical recording characterizes the music that is represented by the musical recording.

17. The method of claim 1, wherein:
the calculated first derivative parameter a machine-derived value extracted from the mathematical analysis of the musical recording;
the determined second derivative parameter represents the extent to which the descriptor is perceivable by a human in the music represented by the analyzed musical recording.

18. A non-transitory computer-readable medium comprising a computer program that, when executed by a computer, causes the computer to perform operations comprising:
analyzing a musical recording by performing digital signal processing to obtain a mathematical analysis of sounds recorded in the musical recording;
calculating a first derivative parameter of the musical recording from the mathematical analysis of the sounds recorded in the musical recording;
determining a second derivative parameter of the musical recording based on the calculated first derivative parameter of the musical recording,
    the second derivative parameter being a scalar that represents an extent to which a descriptor is humanly perceivable in music represented by the musical recording;

storing the determined second derivative parameter of the musical recording as a characteristic of the musical recording;

receiving a search query that references a portion of a representative recording for which a similar recording is sought;

analyzing the portion of the representative recording by performing digital signal processing to obtain a further mathematical analysis of sounds recorded in the portion;

calculating a further first derivative parameter of the portion from the further mathematical analysis of the sounds recorded in the portion;

determining a further second derivative parameter of the portion,
the further second derivative parameter being a further scalar that represents a different extent to which the descriptor is humanly perceivable in the portion; and in response to the search query, providing a search result that references the musical recording based on a comparison of the scalar to the further scalar.

19. A computer system comprising:

a computer; and a computer program that, when executed by the computer, causes the computer to perform operations comprising:

analyzing a musical recording by performing digital signal processing to obtain a mathematical analysis of sounds recorded in the musical recording;

calculating a first derivative parameter of the musical recording from the mathematical analysis of the sounds recorded in the musical recording;

determining a second derivative parameter of the musical recording based on the calculated first derivative parameter of the musical recording,
the second derivative parameter being a scalar that represents an extent to which a descriptor is humanly perceivable in music represented by the musical recording;

storing the determined second derivative parameter of the musical recording as a characteristic of the musical recording;

receiving a search query that references a portion of a representative recording for which a similar recording is sought;

analyzing the portion of the representative recording by performing digital signal processing to obtain a further mathematical analysis of sounds recorded in the portion;

calculating a further first derivative parameter of the portion from the further mathematical analysis of the sounds recorded in the portion;

determining a further second derivative parameter of the portion,
the further second derivative parameter being a further scalar that represents a different extent to which the descriptor is humanly perceivable in the portion; and in response to the search query, providing a search result that references the musical recording based on a comparison of the scalar to the further scalar.

* * * * *

UNITED STATES PATENT AND TRADEMARK OFFICE
CERTIFICATE OF CORRECTION

Page 1 of 1

PATENT NO. : 8,805,657 B2
APPLICATION NO. : 13/667683
DATED : August 12, 2014
INVENTOR(S) : Wells et al.

It is certified that error appears in the above-identified patent and that said Letters Patent is hereby corrected as shown below:

On the Title Page

On page 2, in column 2, under "Other Publications", line 3, delete "Anlysis" and insert --Analysis--, therefor In the Specification In column 8, line 57, after "Legends", insert --:--, therefor In column 12, line 56, delete "503" and insert --502--, therefor In column 13, line 58, delete "($\beta_1$-($\beta_n$)" and insert --($\beta_1$-$\beta_n$)--, therefor In column 14, line 58, delete "variablity" and insert --variability--, therefor In column 15, line 32, delete "modelled" and insert --modeled--, therefor Signed and Sealed this
Eleventh Day of November, 2014

Michelle K. Lee
*Deputy Director of the United States Patent and Trademark Office*